No. 648,922. Patented May 8, 1900.
F. H. CHACE.
WATERING TROUGH.
(Application filed Jan. 6, 1900.)
(No Model.)
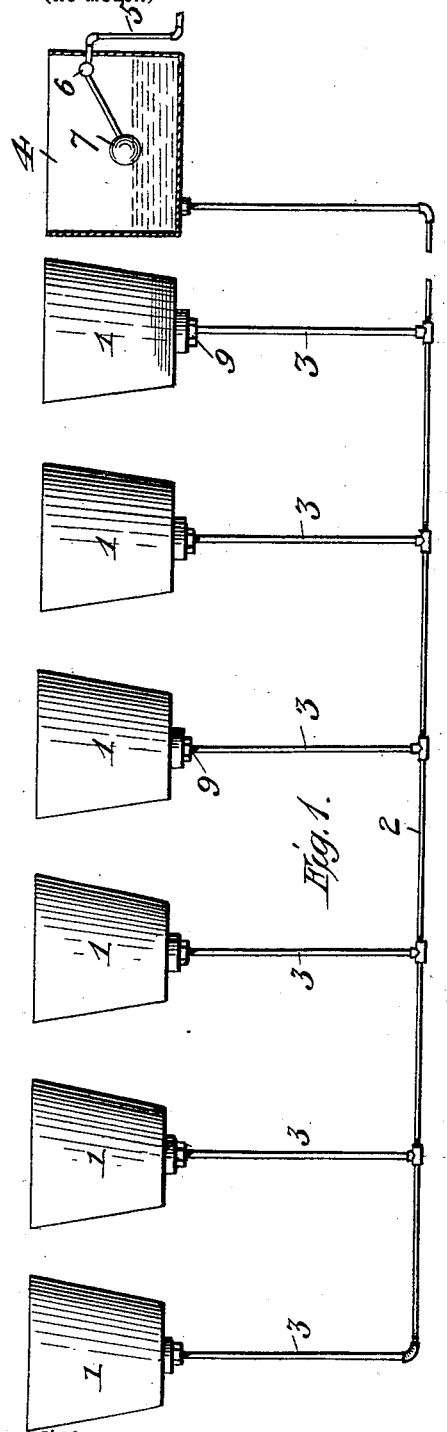
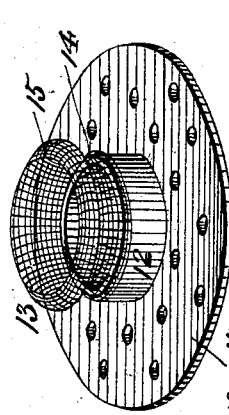
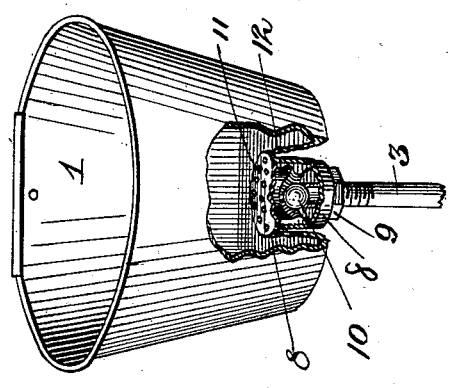
Witnesses:
Inventor
F. H. Chace,
Attorneys.

UNITED STATES PATENT OFFICE.

FRANK HOUGHTON CHACE, OF SHERMAN, NEW YORK.

WATERING-TROUGH.

SPECIFICATION forming part of Letters Patent No. 648,922, dated May 8, 1900.

Application filed January 6, 1900. Serial No. 598. (No model.)

*To all whom it may concern:*

Be it known that I, FRANK HOUGHTON CHACE, a citizen of the United States, residing at Sherman, in the county of Chautauqua and State of New York, have invented certain new and useful Improvements in Watering-Troughs; and I do hereby declare the following to be a full, clear, and exact description of the invention, such as will enable others skilled in the art to which it appertains to make and use the same.

My invention relates to a watering bucket or trough; and it consists in certain novel features of combination and construction of parts, as will be hereinafter fully described, claimed, and illustrated in the accompanying drawings, made a part of this application.

One object of my invention is to provide reliably-efficient means whereby a water trough or bucket will be automatically filled to a certain level, the water thus disposed being retained within the trough or bucket until drank by horses, cattle, or other stock.

A further object is to provide means whereby a group of water buckets or troughs may be operatively located upon the same supply-pipe.

A further object, among others, is to provide means located in each trough or bucket which will render all of them independent of each other to the extent that if the water is drank from one of the troughs the level of the water in the other troughs or buckets will not be disturbed or lowered in order to again fill the emptied bucket; but said emptied bucket will be refilled from the supply-tank or other source, as will be hereinafter more fully pointed out.

A further object is to provide means whereby any foreign matter, as remnants of food—as hay, grain, &c.—which may fall from the mouth of the animal while drinking may not fall into the valve employed to hold the water within the trough, and thereby clog the same or the pipe in communication therewith.

The foregoing objects and advantages will be made fully apparent from the following specification, reference being had to the accompanying drawings, in which—

Figure 1 is a view in elevation illustrating how a group of troughs or buckets may be connected to one source of supply. Fig. 2 is a perspective detail view, partly in section, showing my improved form of valve and means to inclose and protect the same. Fig. 3 is a perspective detail view of the under side of the perforated plate employed to inclose my improved valve proper. Fig. 4 is a section of the protecting device employed by me to prevent sediment, as remnants of food, from entering the valve-seat and the supply-pipe. Fig. 5 is a central section of the valve.

In carrying out my invention it will be understood that any preferred number of troughs or buckets 1 may be provided, said troughs or buckets being of any desired shape and each of them duly connected with the supply-pipe 2 by individual branches 3, said supply-pipe, it being understood, being extended to any desired point where the source of water-supply is located—as, for instance, to the tank 4—which latter shall be provided with suitable pipe connections 5, by which the water is introduced into the tank, and further provided with the valve 6, controlled by the float 7 in the usual manner in order that the water may be kept in the tank 4 at a predetermined height.

It will be understood that the series of troughs or buckets 1 shall be properly located with respect to the supply-tank 4 in order that the same may be on a level therewith, it being obvious that the supply-pipe 2 may be extended under the surface of the ground in order to prevent freezing and in order to dispose the same out of the way.

It will be understood that the buckets or troughs may be of any preferred shape, and within the bottom of each bucket I provide the depending cup-shaped receptacle 8, which is provided with a threaded aperture designed to receive the bushing 9, the upper end of which extends above the bottom of the cup 8 and provides a seat for the ball 10, formed of rubber or other preferred material, it being understood that said bushing is tubular and suitably threaded at the lower end of its bore and adapted to receive the threaded end of the branch pipe 3, as clearly shown in Fig. 5.

In order to prevent the branch pipe 3 from becoming clogged, and, further, to afford means for holding the ball 10 upon its seat provided upon the upper end of the bushing 9, I dispose the perforated plate 11, which is preferably countersunk in the upper edge of the cup 8, so that the upper surface thereof will lie flush with the surface of the bottom of the trough, as clearly indicated in Fig. 5. An annularly-disposed integral flange 12 is formed upon the lower side of the plate 11, designed to surround the ball 10 as it rests upon its seat, the object of said flange being to prevent the said ball from falling entirely off of its seat, as will be readily understood, the diameter of said flange 12 being such that it will permit the ball 10 to be freely received thereby and have the requisite play within the chamber thus provided above the bushing incident to the introduction of the water through the bushing. The edge of the plate 11, or that portion extending beyond the flange 12, is perorated, it being understood that the central portion of said flange, or that part within the flange 12, is to remain unperforated.

In order to more reliably guard against the deposit of foreign matter within the branch 3, I secure in any preferred way to the lower end of the flange 12 the guard 13, formed of closely-meshed wire and provided with the flared upper end 14, designed to tightly fit around the lower end of the flange 12, and further provided at its lower end with the outwardly and upwardly directed lip 15, designed to gather and hold the sediment which would otherwise pass into the branch 3, it being obvious that the said guard may be readily cleansed by raising the perforated plate 11, and thereby withdrawing said guard. The curved lip 15 will thereby enable the operator to remove from the valve all accumulated sediment, and since the guard may be easily removed from the flange 12 and cleansed, as by shaking the same, it is obvious that said guard will prove an efficient means for protecting the valve proper from becoming clogged and the pipe 3 from being fouled, and thereby disturb the purity of water-supply.

The operation of my invention may be stated to be as follows: The supply-tank, together with the pipes 2 and 3, may be properly located, the branch 3 being multiplied in number according to the number of tanks or buckets which it is desired to provide, it being understood that said troughs or buckets may be located in different fields or pastures, or one of said buckets may be provided for each horse or other animal in a stable, it being understood that the height to which the water is to be raised and normally held in each of said buckets will determine the height at which the supply-tank is to be disposed, it being obvious that the supply-tank may be separated a greater or less distance, as desired, from the individual buckets or troughs, as I have indicated in Fig. 1, by breaking away the supply-pipe 2. The float-valve 6 and 7 is to be so adjusted that a proper height of the water in the tank 4 will be assured, and since the water will rise to the same level within the individual buckets or troughs 1 the requisite supply of water will at once be provided as soon as the supply-tank has been filled to the limit. If the water is drank from one of the buckets, the height of the water in the other buckets will not be disturbed, inasmuch as the water in said buckets cannot pass downward to a common level within the exhausted bucket owing to the valve 10. The exhausted bucket, however, will be filled by the supply-tank 4, thus leaving the contents of the other buckets wholly undisturbed. Inasmuch as the guard 13 wholly surrounds the upper end of the branch pipe 3, the outwardly and upwardly directed lip carried thereby will gather any floating particles casually deposited in the water.

While I have described my improved valve as provided with a protecting-guard 13, it will be understood that I reserve the right to entirely dispense with the use of said guard in case I find it desirable to do so, and I therefore reserve the right to make use of said protecting device or entirely dispense with the same. It will be understood that my improved valve will be found very desirable, cheap, and efficient for all of the purposes for which such a valve is suited, as well as for the special purpose which I have herein described, and I therefore reserve the right to so extend the use thereof to any situation where it is advantageous.

While I have described the preferred construction of the various details of my invention, it will be understood that I desire to comprehend in this application the substantial equivalent thereof and do not, therefore, wish to be confined strictly to the exact showing herein presented.

Believing that the construction and advantages of my improved watering-trough and valve therefor will be fully understood from the foregoing specification, considered in connection with the accompanying drawings, I will dispense with further reference to the details thereof.

Having thus fully described my invention, what I claim as new, and desire to secure by Letters Patent, is—

1. The herein-described valve and protector therefor, comprising a housing 8, formed in the bottom of the trough; a supply-pipe operatively connected to the lower end of said housing and extending slightly above the same; a valve-seat formed upon the end of said branch pipe; a ball located in said seat; a perforated cap having a depending flange resting on the upper end of said housing; and a guard formed of wire-cloth or the like secured to said flange and depending therefrom around the end of the branch pipe and the ball and coöperating therewith, all combined in the manner specified and for the purpose set forth.

2. The combination with a suitable supply-tank and valve therefor, of a series of troughs, each trough having a valve located therein, and a guard formed of wire-cloth and having a radial outwardly-directed lip 15 designed to gather accumulated sediment, as specified and for the purpose set forth.

3. A water trough or bucket having a downwardly-extending receptacle 8, located in the bottom thereof, said receptacle having a central aperture; a bushing 9 secured in said aperture; a supply-pipe operatively connected to the lower end of said bushing; a valve-seat provided in the upper end of the said bushing; a ball located in said seat and a guard formed of wire-cloth or the like adapted to surround said ball and seat having a radial outwardly and upwardly directed lip designed to prevent the flow of sediment into said pipe, all combined in the manner specified and for the purpose set forth.

In testimony whereof I affix my signature in presence of two witnesses.

FRANK HOUGHTON CHACE.

Witnesses:
CHAS. S. JONES,
H. F. YOUNG.